(12) United States Patent
Kang et al.

(10) Patent No.: US 7,565,185 B2
(45) Date of Patent: Jul. 21, 2009

(54) THREE-AXIAL ROTATION TYPE MOBILE COMMUNICATION TERMINAL

(75) Inventors: Kwon Jin Kang, Seoul (KR); Jung-Ohn Yim, Seoul (KR)

(73) Assignee: LG Electronics Inc., Seoul (KR)

( * ) Notice: Subject to any disclaimer, the term of this patent is extended or adjusted under 35 U.S.C. 154(b) by 703 days.

(21) Appl. No.: 11/330,674

(22) Filed: Jan. 11, 2006

(65) Prior Publication Data

US 2006/0154702 A1 Jul. 13, 2006

(30) Foreign Application Priority Data

Jan. 13, 2005 (KR) .................. 10-2005-0003388

(51) Int. Cl.
*H04M 1/00* (2006.01)
(52) U.S. Cl. .................. 455/575.3; 455/90.3; 16/366
(58) Field of Classification Search .............. 455/550.1, 455/575.1, 575.3, 90.1, 90.3, 351; 379/433.11, 379/433.13; 16/221, 250, 365–367
See application file for complete search history.

(56) References Cited

U.S. PATENT DOCUMENTS 7,356,881 B2 *  4/2008 Park et al. ............... 16/367
2005/0282596 A1 * 12/2005 Park et al. ............... 455/575.3
2006/0135225 A1 *  6/2006 Lin et al. ................. 455/575.3

* cited by examiner

*Primary Examiner*—Thanh C Le
(74) *Attorney, Agent, or Firm*—Lee, Hong, Degerman, Kang & Waimey (57) ABSTRACT

Disclosed herein is a three-axial rotation type mobile communication terminal. The mobile communication terminal includes a body part, a folder part disposed on the body part in the thickness-wise direction of the body part, and a hinge unit. The hinge unit includes a first hinge part mounted at one corner of the body part such that the first hinge part can be rotated relative to the body part about a rotation axis arranged in the thickness-wise direction of the body part, a second hinge part mounted at the top of the first hinge part such that the second hinge part can be hingedly rotated relative to the first hinge part about a hinged rotation axis arranged perpendicular to the rotation axis of the first hinge part, and a third hinge part having one end coupled to the second hinge part such that the third hinge part can be rotated relative to the second hinge part about a rotation axis perpendicular to the hinged rotation axis of the second hinge part and the other end coupled to the folder part.

18 Claims, 9 Drawing Sheets

Fig. 1

(Prior Art)

Fig. 2

(Prior Art)

THREE-AXIAL ROTATION TYPE MOBILE COMMUNICATION TERMINAL

Pursuant to 35 U.S.C. § 119(a), this application claims the benefit of earlier filing date and right of priority to Korean Patent Application No(s). 10-2005-0003388 filed on Jan. 13, 2005, which is hereby incorporated by reference herein in their entirety.

BACKGROUND OF THE INVENTION

1. Field of the Invention

The present invention relates to a three-axial rotation type mobile communication terminal, and, more particularly, to a three-axial rotation type mobile communication terminal that is capable of allowing appropriate rotation of a folder part relative to a body part, thereby improving a user's convenience.

2. Description of the Related Art

Figure 1:
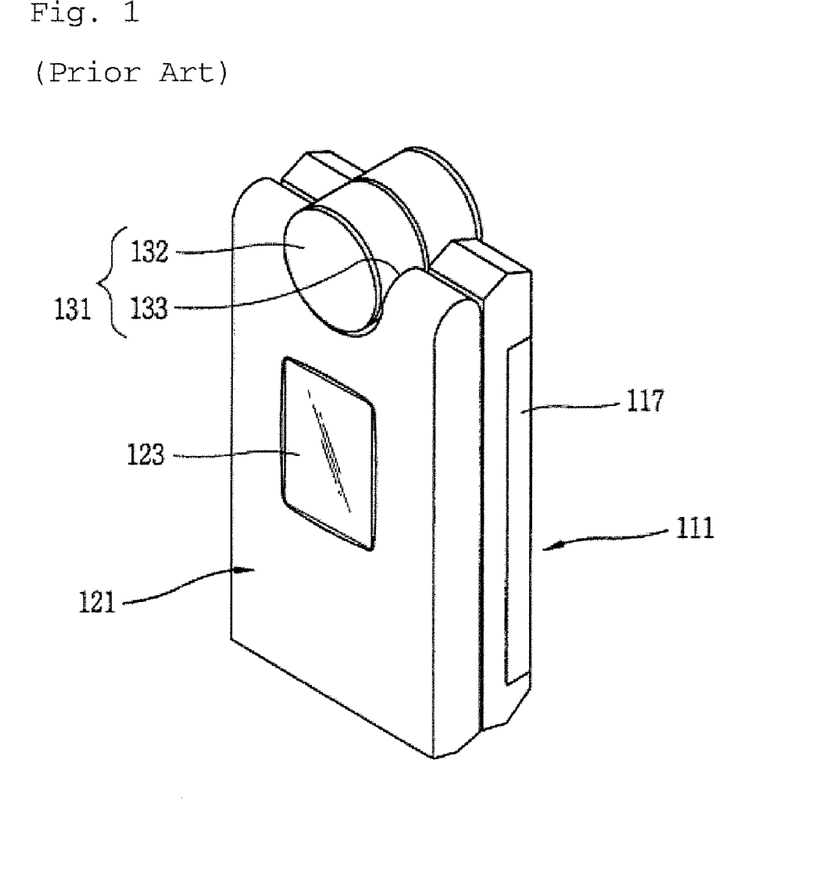
FIG. 1 is a perspective view illustrating a conventional mobile communication terminal.
Figure 2:
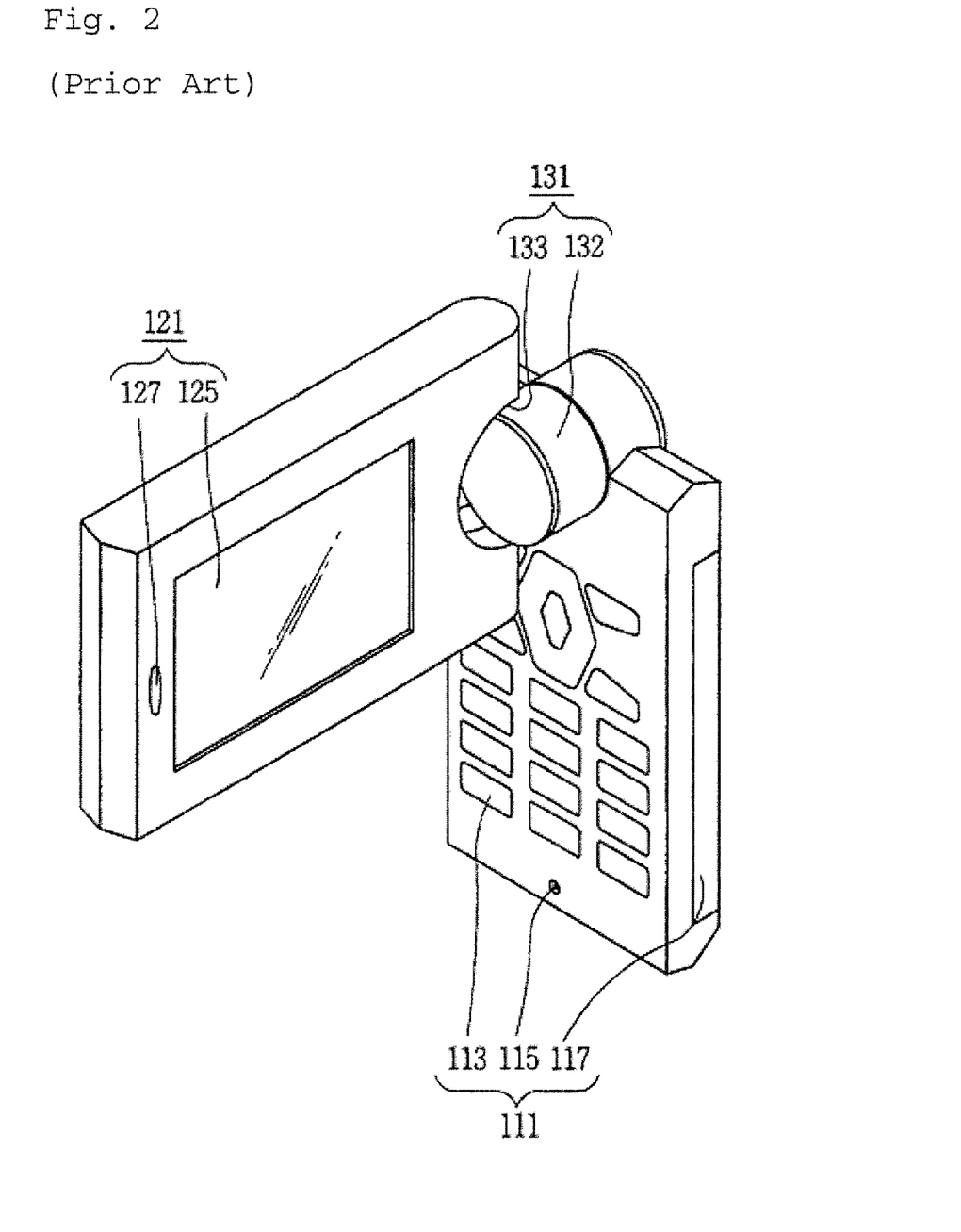
FIG. 2 is a perspective view illustrating the rotation of a folder part of the conventional mobile communication terminal shown in FIG. 1.

FIG. 1 is a perspective view illustrating a conventional mobile communication terminal, and FIG. 2 is a perspective view illustrating the rotation of a folder part of the conventional mobile communication terminal shown in FIG. 1. As shown in FIGS. 1 and 2, the mobile communication terminal includes a body part 111 and a folder part 121 coupled to the body part 111 such that the folder part 121 can be rotated relative to the body part 111.

At the front of the body part 111 is mounted a key group including a plurality of keys 113 for a user to input data. At the front of the body part 111 is also mounted a microphone 115 for the user to input sound information. The microphone 115 is disposed adjacent to one side of the key group. To the rear of the body part 111 is detachably attached a battery 117 for supplying power necessary to operate the mobile communication terminal. At the side of the body part 111 is mounted a camera (not shown) for the user to take still or motion pictures.

At the outside and the inside of the folder part 121 are mounted an outer display unit 123 and an inner display unit 125, respectively. At the inside of the folder part 121 is also mounted a speaker 127 for outputting sound. The speaker 127 is disposed adjacent to one side of the inner display unit 125.

At the upper front of the body part 111a is mounted a hinge unit 131 for supporting the folder part 121 such that the folder part 121 can be rotated relative to the body part 111. The hinge unit 131 includes a vertical hinge part 132 rotatable about a rotation axis arranged in the thickness-wise direction of the body part 111 and a horizontal hinge part 133 rotatably coupled to the vertical hinge part 132.

When the user wishes to vocally communicate with someone, the user hingedly rotates the folder part 121 about the horizontal hinge part 133 in the longitudinal direction of the body part 111 such that the front of the body part 111 and the inside of the folder part 121 are fully exposed. When the user wishes to take pictures using the camera mounted in the body part 111, on the other hand, as shown in FIG. 2, the user hingedly rotates the folder part 121 about the horizontal hinge part 133 until the folder part 121 is at a right angle to the body part 111, and then rotates the folder part 121 about the vertical hinge part 132 such that the inner display unit 125 of the folder part 121 faces the user. In this state, the user can take still or motion pictures while watching an image displayed on the inner display unit 125.

In the conventional mobile communication terminal with the above-stated construction, however, the hinge unit 131 is mounted at the center of the upper end of the body part 111, and the folder part 121 is rotated relative to the body part 111 about only the vertical hinge part 132 and the horizontal hinge part 133. As a result, it is difficult for the user to watch a screen having a relatively large width or to input characters while watching the large-width screen.

SUMMARY OF THE INVENTION

Therefore, the present invention has been made in view of the above problems, and it is an object of the present invention to provide a three-axial rotation type mobile communication terminal that is capable of allowing appropriate rotation of a folder part relative to a body part, thereby improving a user's convenience.

In accordance with the present invention, the above and other objects can be accomplished by the provision of a three-axial rotation type mobile communication terminal comprising: a body part; a folder part disposed on the body part in the thickness-wise direction of the body part, and a hinge unit, wherein the hinge unit includes a first hinge part mounted at one corner of the body part such that the first hinge part can be rotated relative to the body part about a rotation axis arranged in the thickness-wise direction of the body part, a second hinge part mounted at the top of the first hinge part such that the second hinge part can be hingedly rotated relative to the first hinge part about a hinged rotation axis arranged perpendicular to the rotation axis of the first hinge part, and a third hinge part having one end coupled to the second hinge part such that the third hinge part can be rotated relative to the second hinge part about a rotation axis perpendicular to the hinged rotation axis of the second hinge part and the other end coupled to the folder part.

Preferably, the body part is provided at the front thereof with a plurality of keys having a QWERTY keyboard arrangement.

Preferably, the first hinge part includes a stationary hinge part fixedly coupled to the body part, a movable hinge part mounted at the top of the stationary hinge part such that the movable hinge part can be rotated relative to the stationary hinge part, and hinge supporting members disposed at the top of the movable hinge part, the hinge supporting members protruding upward in the thickness-wise direction of the body part for supporting one end of the second hinge part such that the second hinge part can be hingedly rotated, the second hinge part includes a yoke coupled to the hinge supporting members such that the yoke can be hingedly rotated and a journal integrally formed with the yoke for performing a sliding rotation relative to the third hinge part, and the third hinge part includes a boss fitted on the journal and a coupling unit integrally formed with the boss, the coupling unit having coupling members, by which the coupling unit is coupled to the folder part.

Preferably, the hinge supporting members are pin joints fixedly mounted at the movable hinge part, each of the pin joints having a pin hole, and the yoke has an eye, through which a pin is inserted, such that the second hinge part 43 can be hingedly rotated relative to the first hinge part 33 by inserting the pin through the pin holes formed at the hinge supporting members and the eye formed at the yoke.

Preferably, the coupling members are screw holes formed at the coupling unit such that screws are threadedly inserted through the screw holes.

Preferably, the stationary hinge part is mounted in the body part.

Preferably, the mobile communication terminal further comprises: a guide unit mounted at the body part, such that the guide unit is opposite to the hinge unit in the lateral direction of the body part while the guide unit protrudes in the thickness-wise direction of the body part, for guiding the hinged rotation of the folder part, and the folder part is provided with a cutoff section, which corresponds to the guide unit.

Preferably, the mobile communication terminal further comprises: a hinge pin disposed at one of the guide unit and the cutoff section, which are in contact with each other, such that the hinge pin can be reciprocated in the lateral direction of the body part; and a pin receiving groove formed at the other of the guide unit and the cutoff section, which are in contact with each other, such that the hinge pin can be engaged in the pin receiving groove.

Preferably, the mobile communication terminal further comprises: guide surfaces formed at the end of the hinge pin and/or the pin receiving groove, whereby the hinge pin and the pin receiving groove are guided along the guide surfaces when the hinge pin and the pin receiving groove approach each other such that the hinge pin can be engaged into or disengaged from the pin receiving groove by the rotation of the folder part.

Preferably, the mobile communication terminal further comprises: a pin spring for applying an elastic force to the hinge pin such that the hinge pin can be protruded toward the pin receiving groove in the lateral direction of the body part.

Preferably, the mobile communication terminal further comprises: a control knob disposed at the guide unit for disengaging the hinge pin from the pin receiving groove.

Preferably, the control knob is slidably coupled to one side of the guide unit, and the mobile communication terminal further comprises: a transmission unit disposed between the hinge pin and the control knob for disengaging the hinge pin from the pin receiving groove when the control knob is slid.

Preferably, the transmission unit converts the displacement of the control knob moved in the direction perpendicular to the reciprocating direction of the hinge pin into the reciprocating movement of the hinge pin.

Preferably, the transmission unit is an articulated link having a first arm and a second arm, which are formed by bending the transmission unit, the first arm and the second arm are rotatably mounted at the guide unit, the first arm is provided at the end thereof with a transmission pin hole, in which a connection pin formed at the hinge pin opposite to the pin receiving groove is engaged such that the connection pin can be slid in the transmission pin hole, and the second arm is provided at the end thereof with a coupling pin, which is engaged in a control knob pin hole formed at the control knob such that the coupling pin can be slid in the control knob pin hole.

Preferably, one end of the pin spring is connected to the first arm, and the other end of the pin spring is connected to the guide unit.

Preferably, the folder part is provided at the outside thereof with an outer display unit for displaying time information and at least one key for inputting a signal.

Preferably, the folder part is provided at the inside thereof with an inner display unit having a longitudinal length extending in the longitudinal direction of the folder part greater than a lateral length extending in the lateral direction of the folder part, and the folder part is also provided at the inside thereof with speakers, which are adjacent to opposite sides of the inner display unit.

Preferably, the body part is provided at one side of the front thereof in the longitudinal direction thereof with a microphone for inputting sound information.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 3:
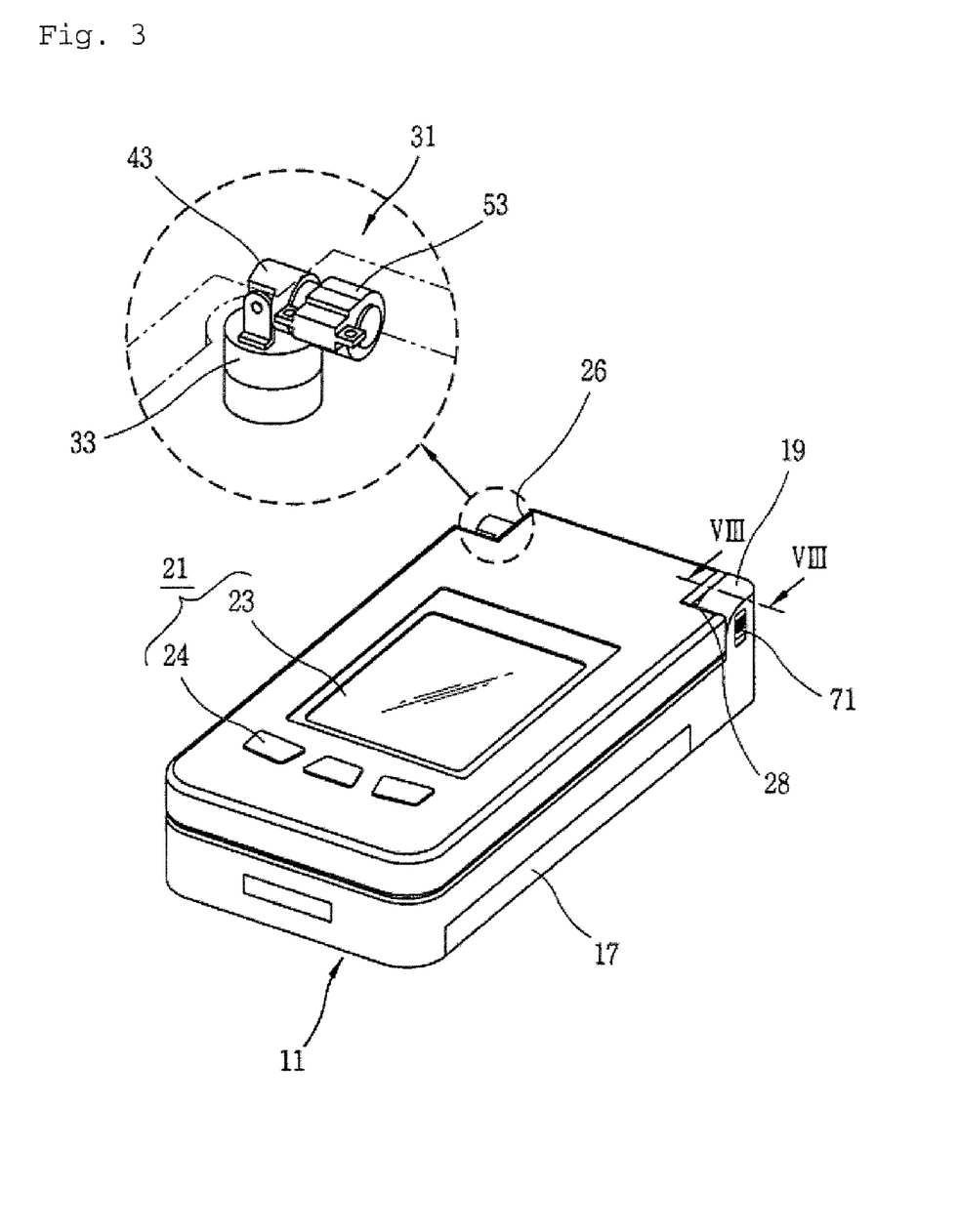
FIG. 3 is a perspective view illustrating a three-axial rotation type mobile communication terminal according to a preferred embodiment of the present invention.
Figure 4:
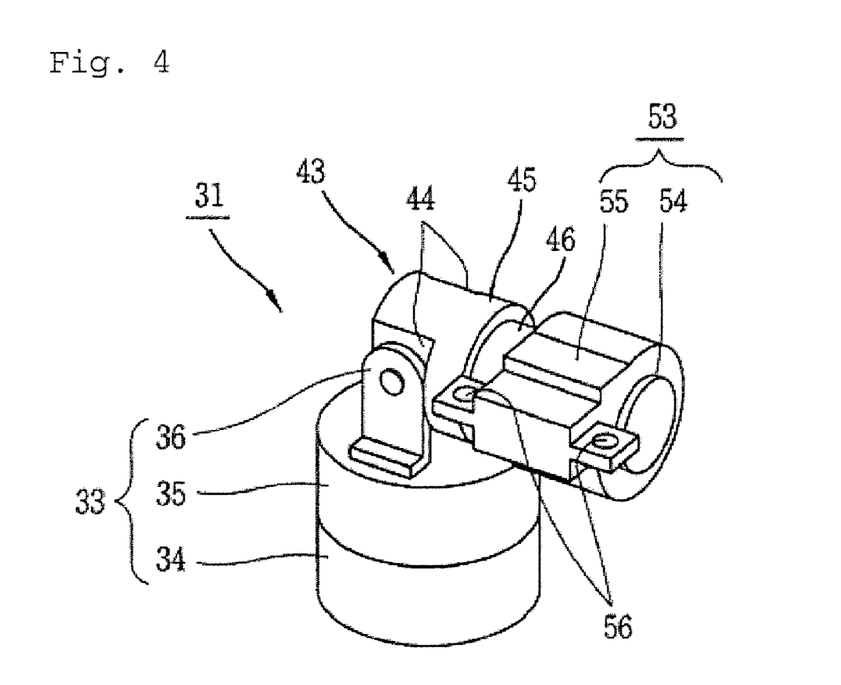
FIG. 4 is an enlarged perspective view illustrating a hinge unit of the three-axial rotation type mobile communication terminal according to the preferred embodiment of the present invention shown in FIG. 3.
Figure 5:
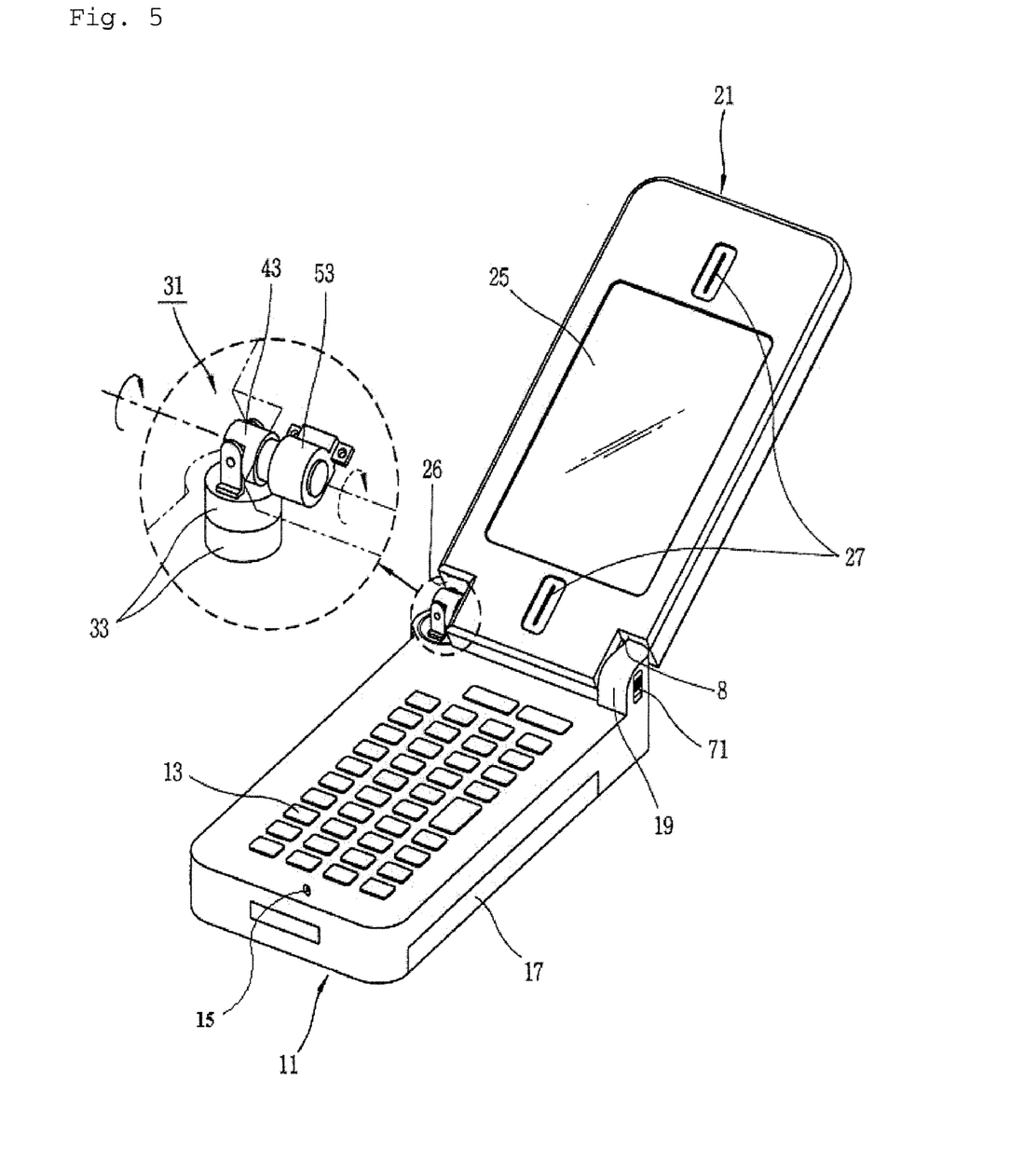
FIG. 5 is a perspective view illustrating the hinged rotation of a folder part in the longitudinal direction of a body part of the three-axial rotation type mobile communication terminal according to the preferred embodiment of the present invention shown in FIG. 3.
Figure 6:
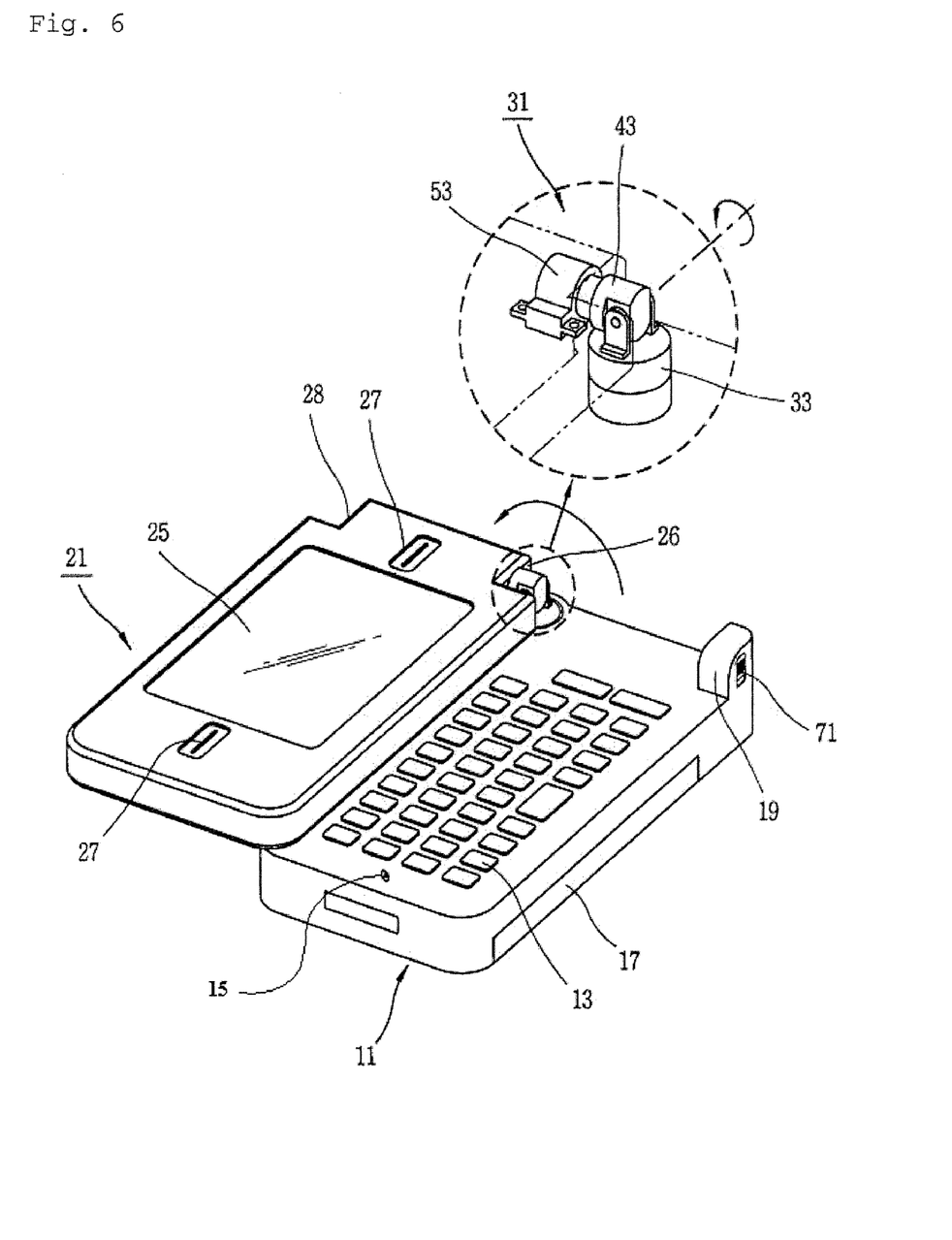
FIG. 6 is a perspective view illustrating the hinged rotation of the folder part in the lateral direction of the body part of the three-axial rotation type mobile communication terminal according to the preferred embodiment of the present invention shown in FIG. 3.
Figure 7:
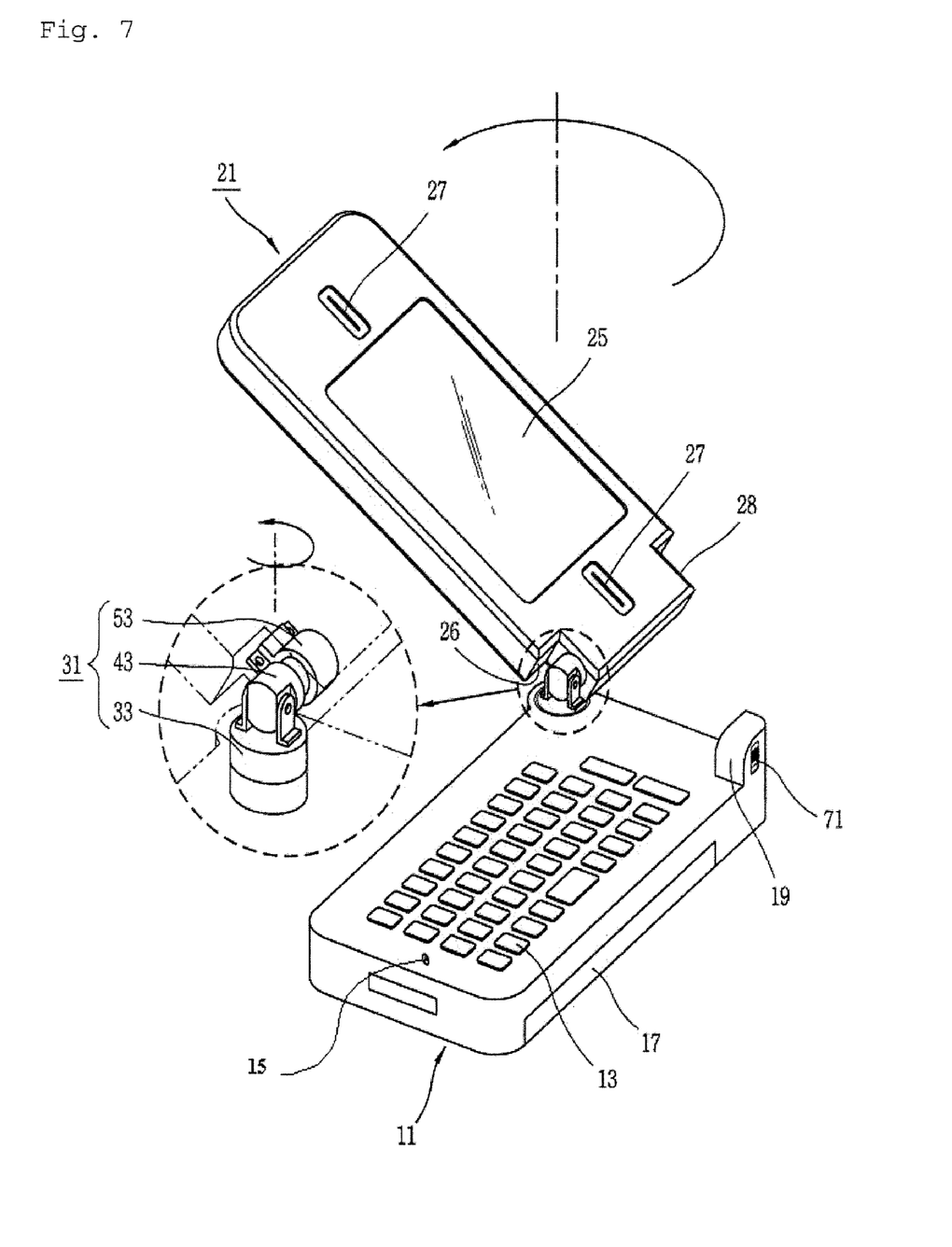
FIG. 7 is a perspective view illustrating the rotation of the folder part of the three-axial rotation type mobile communication terminal according to the preferred embodiment of the present invention shown in FIG. 6.
Figure 8:
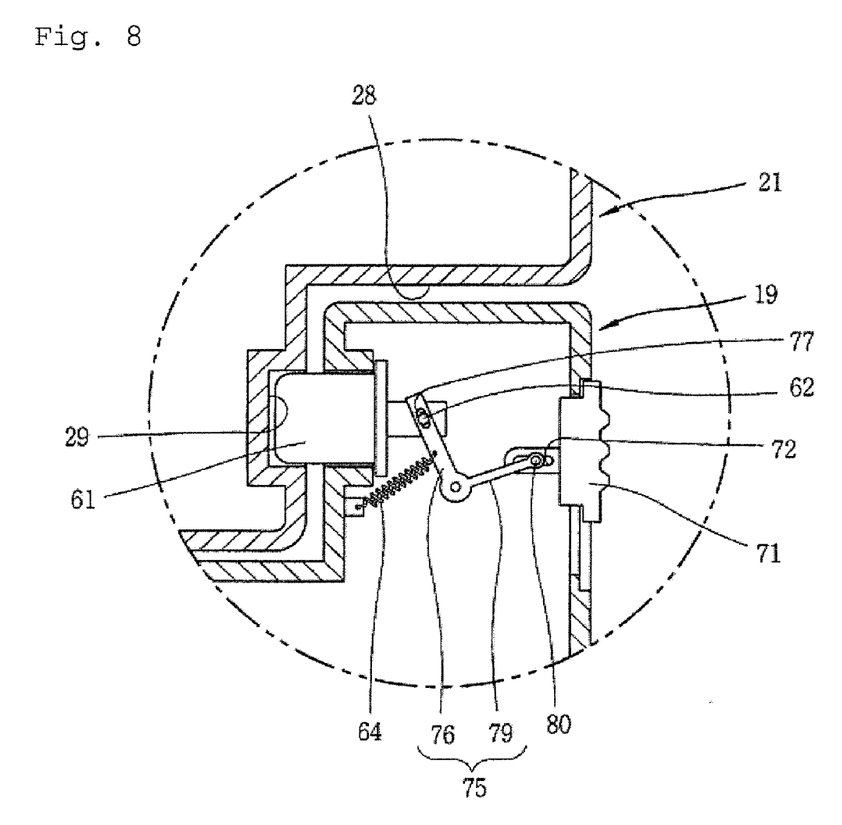
FIG. 8 is a sectional view taken along line VIII-VIII of FIG. 3.
Figure 9:
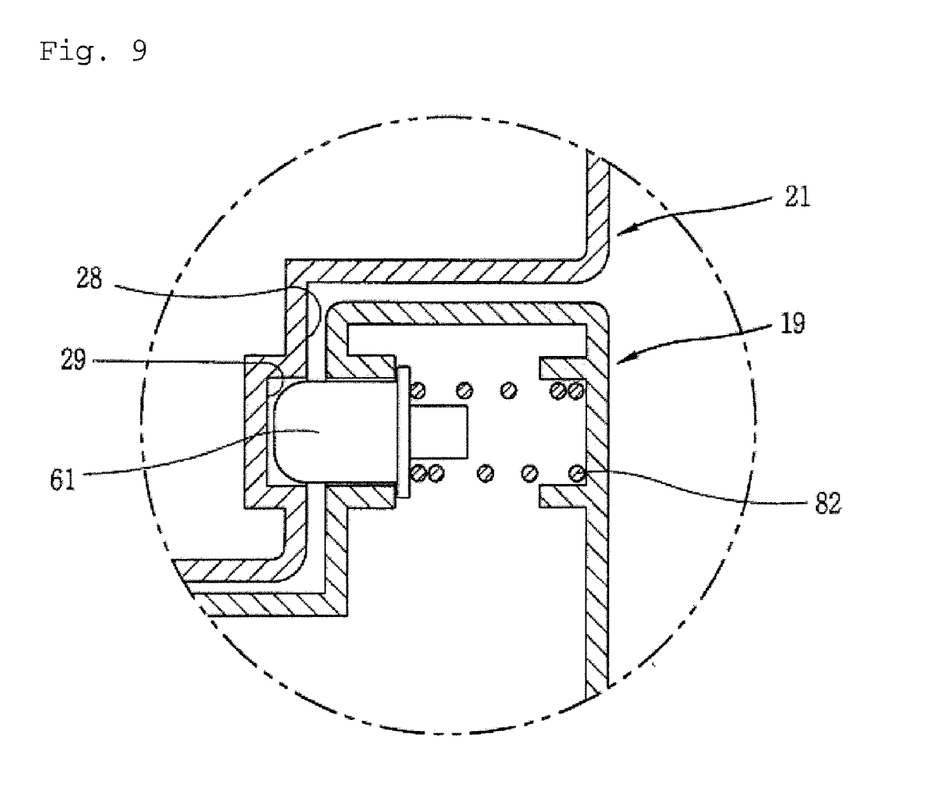
FIG. 9 is a sectional view illustrating a hinge pin driving mechanism according to another preferred embodiment of the present invention.

FIG. 3 is a perspective view illustrating a three-axial rotation type mobile communication terminal according to a preferred embodiment of the present invention, FIG. 4 is an enlarged perspective view illustrating a hinge unit of the three-axial rotation type mobile communication terminal according to the preferred embodiment of the present invention shown in FIG. 3, FIG. 5 is a perspective view illustrating the hinged rotation of a folder part in the longitudinal direction of a body part of the three-axial rotation type mobile communication terminal according to the preferred embodiment of the present invention shown in FIG. 3, FIG. 6 is a perspective view illustrating the hinged rotation of the folder part in the lateral direction of the body part of the three-axial rotation type mobile communication terminal according to the preferred embodiment of the present invention shown in FIG. 3, FIG. 7 is a perspective view illustrating the rotation of the folder part of the three-axial rotation type mobile communication terminal according to the preferred embodiment of the present invention shown in FIG. 6, FIG. 8 is a sectional view taken along line VIII-VIII of FIG. 3, and FIG. 9 is a sectional view illustrating a hinge pin driving mechanism according to another preferred embodiment of the present invention.

As shown in FIGS. 3 to 8, the three-axial rotation type mobile communication terminal according to the present invention comprises: a body part 11; a folder part 21 disposed on the body part 11 in the thickness-wise direction of the body part 11; and a hinge unit 31 including a first hinge part 33 mounted at one corner of the body part 11 such that the first hinge part 33 can be rotated relative to the body part 11 about a rotation axis arranged in the thickness-wise direction of the body part 11, a second hinge part 43 mounted at the top of the first hinge part 33 such that the second hinge part 43 can be hingedly rotated relative to the first hinge part 33 about a hinged rotation axis arranged perpendicular to the rotation axis of the first hinge part 33, and a third hinge part 53 having one end coupled to the second hinge part 43 such that the third hinge part 53 can be rotated relative to the second hinge part 43 about a rotation axis perpendicular to the hinged rotation axis of the second hinge part 43 and the other end coupled to the folder part 21.

At the front of the body part 11 are disposed a plurality of keys 13, which are arranged in the same manner as a QWERTY keyboard while the upper part of the QWERTY board is disposed at the left edge of the body part 11. At the lower end of the front of the body part 111 is mounted a microphone 15 for a user to input sound information. To the rear of the body part 11 is detachably attached a battery 17 for supplying power necessary to operate the mobile communication terminal.

At the outside of the folder part 21 is mounted an outer display unit 23 for displaying time information. At the outside of the folder part 21 adjacent to one side of the outer display unit 23 are disposed a plurality of keys 24 for the user to input operation instructions. At the inside of the folder part 21 is mounted an inner display unit 25, which has a longitudinal length extending in the longitudinal direction of the folder part 21 greater than a lateral length extending in the lateral direction of the folder part 21. At the inside of the folder part 21 adjacent to opposite sides of the inner display unit 25 are mounted a pair of speakers 27.

The hinge unit 31 is mounted at the left corner of the upper front of the body part 11 for allowing the folder part 21 to be rotated about rotation axes arranged in the longitudinal direction, the lateral direction, and the thickness-wise direction of the body part 11. At the body part 11 is also mounted a guide unit 19, which is disposed opposite to the hinge unit 31 in the lateral direction of the body part 11 for guiding the hinged rotation of the folder part 21.

The first hinge part 33, which is one component of the hinge unit 31, is mounted in the body part 11 such that the rotation axis is arranged in the thickness-wise direction of the body part 11. The second hinge part 43, which is another component of the hinge unit 31, is mounted at the top of the first hinge part 33 such that the second hinge part 43 can be hingedly rotated relative to the first hinge part 33. The third hinge part 53, which is the other component of the hinge unit 31, is mounted in the folder part 21 at one end thereof, and is coupled to the second hinge part 43 at the other end thereof such that the third hinge part 53 can be rotated relative to the second hinge part 43.

The first hinge part 33 includes a stationary hinge part 34, formed in the shape of a disc, fixedly mounted in the body part 11, and a movable hinge part 35 mounted at the top of the stationary hinge part 34 such that the movable hinge part 35 can be rotated relative to the stationary hinge part 34. At the top of the movable hinge part 35 are disposed hinge supporting members 36, which protrude upward in the thickness-wise direction of the body part 11 for supporting one end of the second hinge part 43 such that the second hinge part 43 can be hingedly rotated.

The second hinge part 43 includes a yoke 45 coupled to the hinge supporting members 36 such that the yoke 45 can be hingedly rotated and a journal 46 integrally formed with the yoke 45 for performing a sliding rotation relative to the third hinge part 53.

The rotatable connection between the yoke 45 and the hinge supporting members 36 may be accomplished using various well-known technologies.

For example, the rotatable connection between the yoke 45 and the hinge supporting members 36 is accomplished using pin joints. Specifically, the hinge supporting members 36 are formed in the shape of pin joints fixedly mounted at the movable hinge part 35. Each of the pin joints has a pin hole. At the yoke 45 is formed an eye, through which a pin is inserted. By inserting the pin through the pin holes formed at the hinge supporting members 36 and the eye formed at the yoke 45, the second hinge part 43 is coupled to the first hinge part 33 such that the second hinge part 43 can be hingedly rotated relative to the first hinge part 33.

At opposite sides of the circumferential surface of the yoke 45 are formed flat parts 44, respectively, which are parallel with each other such that the yoke 45 can be fitted between the hinge supporting members 36, and therefore, the rotatable connection between the hinge supporting members 36 and the yoke 45 is stably accomplished.

The third hinge part 53 includes a boss 54 fitted on the journal 46, which is integrally formed with the yoke 45, and a coupling unit 55 integrally formed with the boss 54. The coupling unit 55 has coupling members, by which the coupling unit 55 is coupled to the folder part 21.

The coupling members may be formed using various well-known technologies. For example, the coupling members are screw holes 56 formed at the coupling unit 55 such that screws (not shown) are threadedly inserted through the screw holes 56.

Preferably, the screw holes 56 are provided in large numbers such that the hinge unit 31 is stably coupled to the folder part 21.

At one corner of the folder part 21 is formed a hinge coupling part 26, to which the third hinge part 53 is coupled. At the other corner of the folder part 21 in the lateral direction of the folder part 21 is formed a cutoff section 29, which corresponds to the guide unit 19.

At the cutoff section 28 is formed a pin receiving groove 29, which is depressed in the lateral direction of the folder part 21. At the guide unit 19 is mounted a hinge pin 61, which corresponds to the pin receiving groove 29, such that the hinge pin 61 can be extended outward from the guide part 19. At the outside of the guide unit 19 is disposed a control knob 71, which is slid in the thickness-wise direction of the body part 11 such that the hinge pin 61 is disengaged from the pin receiving groove 29 in the lateral direction of the body part 11, and therefore, the hinge pin 61 is withdrawn into the guide unit 19.

In the guide unit 19 is mounted a pin spring 64, for example, a tension spring, which is disposed at one side of the guide unit 19 for applying an elastic force to the hinge pin 61 such that the hinge pin 61 can be extended outward. Between the hinge pin 61 and the control knob 71 is disposed a transmission unit 75, by which the hinge pin 61 is extended outward from the guide unit 19 and is withdrawn inward into the guide unit 19, i.e., the hinge pin 61 is reciprocated, when the control knob 71 is slid in the thickness-wise direction of the body part 11.

The transmission unit 75 converts the displacement of the control knob 71 moved in the direction perpendicular to the reciprocating direction of the hinge pin 61 into the reciprocating movement of the hinge pin 61. Consequently, the user can easily and conveniently slide the control knob 71 using his/her thumb.

The transmission unit 75 is an articulated link having a first arm 76 and a second arm 79, which are formed by bending the transmission unit 75. The first arm 76 and the second arm 79 are rotatably mounted at the guide unit 19. At the end of the first arm 76 is formed a transmission pin hole 77, in which a connection pin 62 formed at the hinge pin 61 opposite to the pin receiving groove 29 is engaged such that the connection pin 62 can be slid in the transmission pin hole 77.

At the end of the second arm 79 is formed a coupling pin 80, which is engaged in a control knob pin hole 72 formed at the control knob 71 such that the coupling pin 80 can be slid in the control knob pin hole 72.

Consequently, when the control knob 71 is slid upward in the thickness-wise direction of the body part 11, the hinge pin 61 is moved toward the pin receiving groove 29 side, i.e., the left side, by the transmission unit 75. When the control knob 71 is slid downward in the thickness-wise direction of the body part 11, on the other hand, the hinge pin 61 is moved away from the pin receiving groove 29 side, i.e., the right side, by the transmission unit 75.

As shown in FIG. 8, it is preferable that one end of the pin spring 64 be connected to the first arm 76, and the other end of the pin spring 64 be connected to the guide unit 19, whereby the operation of the transmission unit 75 is properly carried out.

The hinge pin driving mechanism may be constructed as shown in FIG. 9. Specifically, the hinge pin 61 is coupled to the guide unit 19 at a predetermined position corresponding to the pin receiving groove 29 such that the hinge pin 61 can be extended outward from and withdrawn inward into the guide unit 19 the guide unit 19, and a pin spring 82, for example, a compression spring, is disposed in the guide unit 19 at the rear of the hinge pin 61 to apply an elastic force to the hinge pin 61 such that the hinge pin 61 can be extended outward from the guide unit 19. In this case, when a predetermined force is applied to the folder part 21 such that the folder part 21 is hingedly rotated about the second hinge part 43, the pin spring 82 is compressed by the force applied to the folder part 21, and therefore, the hinge pin 61 is disengaged from the pin receiving groove 29.

To this end, guide surfaces are formed at the end of the hinge pin 61 and/or the pin receiving groove 29. Consequently, the engagement or disengagement of the hinge pin 61 into or from the pin receiving groove 29 is accomplished by a manipulation of the folder part 21.

In the three-axial rotation type mobile communication terminal with the above-stated construction according to the present invention, when the folder part 21 is disposed on the body part 11 such that the front of the body part 11 is hidden by the folder part 21, as shown in FIG. 3, the mobile communication terminal is on standby. At this time, the user can appropriately press the keys 24 such that time information, for example, current time or a short-sentence message, is displayed on the outer display unit 23.

When the user wishes to vocally communicate with a third party, the user hingedly rotates the third hinge part 53 about the second hinge part 43 in the longitudinal direction of the body part 11 such that the front of the body part 11 and the inside of the folder part 21 are fully exposed. Now, the user can vocally communicate with the third party using the microphone 15 and the speakers 27.

When the user wishes to watch a screen having a relatively large width or to input characters, on the other hand, the user slides the control knob 71 downward in the thickness-wise direction of the body part 11, in the state that the folder part 21 is disposed on the body part 11 as shown in FIG. 3, such that the hinge pin 61 is disengaged from the pin receiving groove 29. Subsequently, the user applies a force to the folder part 21 such that the second hinge part 43 is hingedly rotated relative to the first hinge part 33. As a result, the folder part 21 is disposed at the left edge of the body part 11, as shown in FIG. 6, such that the user can easily and rapidly input data using keys having the QWERTY keyboard arrangement.

In the state that the folder part 21 is hingedly rotated relative to the body part in the longitudinal direction of the body part 11 such that the front of the body part 111 and the inside of the folder part 121 are exposed, as shown in FIG. 5, the user slides the control knob 71 downward in the thickness-wise direction of the body part 11 such that the hinge pin 61 is disengaged from the pin receiving groove 29, and then rotates the folder part 21 relative to the body part 11 about the first hinge part 33.

When the user wishes to vocally communicate with a third party while the folder part 21 is disposed at the left edge of the body part 11, on the other hand, the user rotates the folder part 21 relative to the body part 11 about the first hinge part 33. As a result, the hinge pin 61 is inserted into the pin receiving groove 29, and the folder part 21 is aligned with the body part 11 in the longitudinal direction of the body part 11. Now, the user can vocally communicate with the third party using the microphone 15 and the speakers 27.

As apparent from the above description, the present invention provides a three-axial rotation type mobile communication terminal according to the present invention comprising a body part, a folder part disposed on the body part in the thickness-wise direction of the body part, and a hinge unit. The hinge unit includes a first hinge part mounted at one corner of the body part such that the first hinge part can be rotated relative to the body part about a rotation axis arranged in the thickness-wise direction of the body part, a second hinge part mounted at the top of the first hinge part such that the second hinge part can be hingedly rotated relative to the first hinge part about a hinged rotation axis arranged perpendicular to the rotation axis of the first hinge part, and a third hinge part having one end coupled to the second hinge part such that the third hinge part can be rotated relative to the second hinge part about a rotation axis perpendicular to the hinged rotation axis of the second hinge part and the other end coupled to the folder part. Consequently, the present invention has the effect of accomplishing appropriate rotation of the folder part relative to the body part, thereby improving a user's convenience.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A three-axial rotation type mobile communication terminal comprising:
    a body part;
    a folder part disposed on the body part in the thickness-wise direction of the body part, and
    a hinge unit, wherein the hinge unit includes
        a first hinge part mounted at one corner of the body part such that the first hinge part can be rotated relative to the body part about a rotation axis arranged in the thickness-wise direction of the body part, a second hinge part mounted at the top of the first hinge part such that the second hinge part can be hingedly rotated relative to the first hinge part about a hinged rotation axis arranged perpendicular to the rotation axis of the first hinge part, and a third hinge part having one end coupled to the second hinge part such that the third hinge part can be rotated relative to the second hinge part about a rotation axis perpendicular to the hinged rotation axis of the second hinge part and the other end coupled to the folder part.

2. The mobile communication terminal as set forth in claim 1, wherein the body part is provided at the front thereof with a plurality of keys having a QWERTY keyboard arrangement.

3. The mobile communication terminal as set forth in claim 1, wherein the first hinge part includes a stationary hinge part fixedly coupled to the body part, a movable hinge part mounted at the top of the stationary hinge part such that the movable hinge part can be rotated relative to the stationary hinge part, and hinge supporting members disposed at the top of the movable hinge part, the hinge supporting members protruding upward in the thickness-wise direction of the body part for supporting one end of the second hinge part such that the second hinge part can be hingedly rotated, the second hinge part includes a yoke coupled to the hinge supporting members such that the yoke can be hingedly rotated and a journal integrally formed with the yoke for performing a sliding rotation relative to the third hinge part, and the third hinge part includes a boss fitted on the journal and a coupling unit integrally formed with the boss, the coupling unit having coupling members, by which the coupling unit is coupled to the folder part.

4. The mobile communication terminal as set forth in claim 3, wherein the hinge supporting members are pin joints fixedly mounted at the movable hinge part, each of the pin joints having a pin hole, and the yoke has an eye, through which a pin is inserted, such that the second hinge part 43 can be hingedly rotated relative to the first hinge part 33 by inserting the pin through the pin holes formed at the hinge supporting members and the eye formed at the yoke.

5. The mobile communication terminal as set forth in claim 3, wherein the coupling members are screw holes formed at the coupling unit such that screws are threadedly inserted through the screw holes.

6. The mobile communication terminal as set forth in claim 3, wherein the stationary hinge part is mounted in the body part.

7. The mobile communication terminal as set forth in claim 1, further comprising:

a guide unit mounted at the body part, such that the guide unit is opposite to the hinge unit in the lateral direction of the body part while the guide unit protrudes in the thickness-wise direction of the body part, for guiding the hinged rotation of the folder part, wherein the folder part is provided with a cutoff section, which corresponds to the guide unit.

8. The mobile communication terminal as set forth in claim 7, further comprising:

a hinge pin disposed at one of the guide unit and the cutoff section, which are in contact with each other, such that the hinge pin can be reciprocated in the lateral direction of the body part; and a pin receiving groove formed at the other of the guide unit and the cutoff section, which are in contact with each other, such that the hinge pin can be engaged in the pin receiving groove.

9. The mobile communication terminal as set forth in claim 8, further comprising:

guide surfaces formed at the end of the hinge pin and/or the pin receiving groove, whereby the hinge pin and the pin receiving groove are guided along the guide surfaces when the hinge pin and the pin receiving groove approach each other such that the hinge pin can be engaged into or disengaged from the pin receiving groove by the rotation of the folder part.

10. The mobile communication terminal as set forth in claim 8, further comprising:

a pin spring for applying an elastic force to the hinge pin such that the hinge pin can be protruded toward the pin receiving groove in the lateral direction of the body part.

11. The mobile communication terminal as set forth in claim 8, further comprising:

a control knob disposed at the guide unit for disengaging the hinge pin from the pin receiving groove.

12. The mobile communication terminal as set forth in claim 11, wherein the control knob is slidably coupled to one side of the guide unit, and wherein the mobile communication terminal further comprises: a transmission unit disposed between the hinge pin and the control knob for disengaging the hinge pin from the pin receiving groove when the control knob is slid.

13. The mobile communication terminal as set forth in claim 12, wherein the transmission unit converts the displacement of the control knob moved in the direction perpendicular to the reciprocating direction of the hinge pin into the reciprocating movement of the hinge pin.

14. The mobile communication terminal as set forth in claim 13, wherein the transmission unit is an articulated link having a first arm and a second arm, which are formed by bending the transmission unit, the first arm and the second arm are rotatably mounted at the guide unit, the first arm is provided at the end thereof with a transmission pin hole, in which a connection pin formed at the hinge pin opposite to the pin receiving groove is engaged such that the connection pin can be slid in the transmission pin hole, and the second arm is provided at the end thereof with a coupling pin, which is engaged in a control knob pin hole formed at the control knob such that the coupling pin can be slid in the control knob pin hole.

15. The mobile communication terminal as set forth in claim 14, wherein one end of the pin spring is connected to the first arm, and the other end of the pin spring is connected to the guide unit.

16. The mobile communication terminal as set forth in claim 1, wherein the folder part is provided at the outside thereof with an outer display unit for displaying time information and at least one key for inputting a signal.

17. The mobile communication terminal as set forth in any one of claims 1 to 16, wherein the folder part is provided at the inside thereof with an inner display unit having a longitudinal length extending in the longitudinal direction of the folder part greater than a lateral length extending in the lateral direction of the folder part, and the folder part is also provided at the inside thereof with speakers, which are adjacent to opposite sides of the inner display unit.

18. The mobile communication terminal as set forth in claim 17, wherein the body part is provided at one side of the front thereof in the longitudinal direction thereof with a microphone for inputting sound information.

\* \* \* \* \*